US008892602B2

(12) United States Patent
Hofer

(10) Patent No.: US 8,892,602 B2
(45) Date of Patent: *Nov. 18, 2014

(54) SECURE CONFIGURATION OF AUTHENTICATION SERVERS

(71) Applicant: Emulex Corporation, Costa Mesa, CA (US)

(72) Inventor: Larry Dean Hofer, Costa Mesa, CA (US)

(73) Assignee: Emulex Corporation, Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/970,500

(22) Filed: Aug. 19, 2013

(65) Prior Publication Data

US 2013/0340042 A1    Dec. 19, 2013

Related U.S. Application Data

(63) Continuation of application No. 12/123,401, filed on May 19, 2008, now Pat. No. 8,515,996.

(51) Int. Cl.
*G06F 17/30* (2006.01)
*H04L 29/06* (2006.01)
*H04L 12/24* (2006.01)

(52) U.S. Cl.
CPC ............ *H04L 63/08* (2013.01); *H04L 63/0428* (2013.01); *H04L 63/083* (2013.01); *H04L 63/20* (2013.01); *H04L 41/0856* (2013.01)
USPC ........... 707/790; 707/792; 707/803; 713/155; 713/161; 713/168; 726/4; 726/17; 726/21; 726/30

(58) Field of Classification Search
CPC ............ H04L 63/0428; H04L 63/0435; H04L 63/0442; H04L 63/0892
USPC .......... 707/790, 792, 803; 713/151, 155–156; 726/1, 3–4
See application file for complete search history.

(56) References Cited

U.S. PATENT DOCUMENTS

| | | | | |
|---|---|---|---|---|
| 5,825,891 | A * | 10/1998 | Levesque et al. | 713/153 |
| 5,944,794 | A * | 8/1999 | Okamoto et al. | 709/225 |
| 6,192,472 | B1 | 2/2001 | Garay et al. | |
| 6,308,268 | B1 * | 10/2001 | Audebert | 713/182 |
| 6,338,138 | B1 | 1/2002 | Raduchel et al. | |
| 6,490,679 | B1 * | 12/2002 | Tumblin et al. | 713/155 |
| 6,493,825 | B1 | 12/2002 | Blumenau et al. | |
| 6,931,549 | B1 | 8/2005 | Ananda | |

(Continued)

OTHER PUBLICATIONS

Eisenhauer, D. et al. (2008). "Fibre Channel over Convergence Enhanced Ethernet Enterprise Data Center Use Cases," *ITC 21*, pp. 1-7.

(Continued)

*Primary Examiner* — Hanh Thai
(74) *Attorney, Agent, or Firm* — McAndrews, Held & Malloy, Ltd.

(57) ABSTRACT

Embodiments of the invention are directed to automatically populating a database of names and secrets in an authentication server by sending one or more lists of one or more names and secrets by a network management software to an authentication server. Furthermore, some embodiments provide that the lists being sent are encrypted and/or embedded in otherwise inconspicuous files.

25 Claims, 4 Drawing Sheets

(56) References Cited

U.S. PATENT DOCUMENTS

| | | |
|---|---|---|
| 6,978,378 B1 | 12/2005 | Koretz |
| 7,021,534 B1* | 4/2006 | Kiliccote ............... 235/380 |
| 7,170,999 B1 | 1/2007 | Kessler et al. |
| 7,222,228 B1 | 5/2007 | Stephens et al. |
| 7,328,260 B1 | 2/2008 | Muthiyan et al. |
| 7,380,708 B1* | 6/2008 | Kiliccote ............... 235/380 |
| 7,472,283 B2 | 12/2008 | Angelo et al. |
| 7,506,040 B1 | 3/2009 | Rabe et al. |
| 7,551,915 B1 | 6/2009 | Manning et al. |
| 7,577,729 B1 | 8/2009 | Umbehocker et al. |
| 7,631,193 B1* | 12/2009 | Hoffman ............... 713/186 |
| 7,685,261 B1 | 3/2010 | Marinelli et al. |
| 7,685,269 B1 | 3/2010 | Thrasher et al. |
| 7,861,097 B2* | 12/2010 | Smeets et al. ......... 713/194 |
| 8,078,876 B2* | 12/2011 | Brickell et al. ........ 713/176 |
| 8,515,996 B2 | 8/2013 | Hofer |
| 2002/0012433 A1 | 1/2002 | Haverinen et al. |
| 2002/0144148 A1 | 10/2002 | Hashem et al. |
| 2003/0099358 A1 | 5/2003 | Michael et al. |
| 2003/0163577 A1 | 8/2003 | Moon et al. |
| 2003/0177393 A1 | 9/2003 | Ishiguro |
| 2003/0217263 A1 | 11/2003 | Sakai |
| 2003/0233440 A1 | 12/2003 | Nakamura et al. |
| 2004/0228492 A1 | 11/2004 | Park |
| 2005/0091487 A1 | 4/2005 | Cross et al. |
| 2005/0138350 A1 | 6/2005 | Hariharan |
| 2005/0154884 A1 | 7/2005 | Van Den Tillaart |
| 2005/0172333 A1* | 8/2005 | Kim ............................ 726/5 |
| 2005/0289655 A1 | 12/2005 | Tidwell et al. |
| 2006/0036856 A1 | 2/2006 | Kok |
| 2006/0101288 A1 | 5/2006 | Smeets et al. |
| 2006/0159268 A1 | 7/2006 | Jung et al. |
| 2006/0236095 A1 | 10/2006 | Smith et al. |
| 2007/0016771 A1 | 1/2007 | Allison et al. |
| 2007/0033399 A1 | 2/2007 | Takeda |
| 2007/0060106 A1 | 3/2007 | Haverinen et al. |
| 2007/0106895 A1* | 5/2007 | Huang et al. ............ 713/170 |
| 2007/0118735 A1 | 5/2007 | Cherrington et al. |
| 2007/0226488 A1 | 9/2007 | Lin et al. |
| 2007/0234043 A1 | 10/2007 | Miyazawa |
| 2008/0065878 A1 | 3/2008 | Hutson et al. |
| 2008/0095369 A1 | 4/2008 | Lucidarme |
| 2008/0209221 A1 | 8/2008 | Vennelakanti et al. |
| 2008/0235509 A1 | 9/2008 | Laberteaux et al. |
| 2008/0267395 A1 | 10/2008 | Deishi |
| 2008/0270786 A1 | 10/2008 | Brickell et al. |
| 2009/0034522 A1 | 2/2009 | Hayes et al. |
| 2009/0049307 A1 | 2/2009 | Lin |
| 2009/0132821 A1 | 5/2009 | Matsuzaki |
| 2009/0187757 A1 | 7/2009 | Kerschbaum |
| 2009/0204806 A1 | 8/2009 | Kanemura et al. |
| 2010/0017599 A1* | 1/2010 | Sellars et al. ........... 713/156 |
| 2010/0088515 A1 | 4/2010 | Nishimoto et al. |
| 2010/0185852 A1* | 7/2010 | Ogawa et al. ........... 713/165 |
| 2010/0228980 A1 | 9/2010 | Falk et al. |
| 2010/0250937 A1* | 9/2010 | Blomquist et al. ..... 713/170 |
| 2012/0210127 A1* | 8/2012 | Kameda et al. ........ 713/168 |

OTHER PUBLICATIONS

Final Office Action mailed Jul. 19, 2011, for U.S. Appl. No. 12/123,401, filed May 19, 2008, 14 pages.
Final Office Action mailed Sep. 27, 2012, for U.S. Appl. No. 12/123,401, filed May 19, 2008, 11 pages.
Non-Final Office Action mailed Sep. 3, 2010, for U.S. Appl. No. 12/123,401, filed May 19, 2008, 15 pages.
Non-Final Office Action mailed Feb. 23, 2011, for U.S. Appl. No. 12/123,401, filed May 19, 2008, 15 pages.
Non-Final Office Action mailed Oct. 31, 2011, for U.S. Appl. No. 12/123,401, filed May 19, 2008, 10 pages.
Non-Final Office Action mailed Apr. 5, 2012, for U.S. Appl. No. 12/123,401, filed May 19, 2008, 10 pages.
Notice of Allowance mailed Apr. 15, 2013, for U.S. Appl. No. 12/123,401, filed May 19, 2008, 10 pages.

* cited by examiner

SECURE CONFIGURATION OF AUTHENTICATION SERVERS

CROSS-REFERENCE TO RELATED APPLICATION

This application is a Continuation application of U.S. patent application Ser. No. 12/123,401 filed May 19, 2008. The contents of the above application are herein incorporated by reference in their entirety for all intended purposes.

FIELD OF THE INVENTION

This relates generally to authentication, and more particularly, to secure and automatic configuration of an authentication server with device names and secrets.

BACKGROUND OF THE INVENTION

An authentication server is a server that provides authentication for various devices. For example, an authentication server may provide authentication for devices on a network. Each device on the network may be assigned a unique name that identifies that device on the network. For authentication purposes, each device may also be assigned a secret (such as a password). Each device may provide its name and secret in order to authenticate itself (i.e., prove that it is in fact the device it purports to be). An authentication server may store the assigned names and secrets of the various devices and use them to determine whether authentications taking place on the network are successful. Authentication servers are generally known in the art. For example, two known types of authentication servers are Remote Authentication Dial In User Service (RADIUS) and DIAMETER servers. RADIUS and DIAMETER are also names of the protocols these servers follow. While RADIUS refers to "Dial In" it is no longer exclusively used for dial in networks and may apply to other types of networks.

As noted above, an authentication server must have the correct name and secret of a device it is to authenticate before it attempts to authenticate it. In many types of networks (such as for example, storage area networks or SANs) the authentication server is loaded with these names and secrets manually (e.g., by a user typing the names and secrets in an authentication server interface). This process can be time consuming, expensive, insecure and susceptible to user errors.

SUMMARY OF THE INVENTION

Embodiments of the invention are directed to automatically populating a database of names and secrets in an authentication server by sending one or more lists of one or more names and secrets by a network management software to an authentication server. Furthermore, some embodiments provide that the lists being sent are encrypted and/or embedded in otherwise inconspicuous files.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

Embodiments of the invention are directed to automatically populating a database of names and secrets in an authentication server by sending one or more lists of one or more names and secrets by a network management software to an authentication server. Furthermore, some embodiments provide that the lists being sent are encrypted and/or embedded in otherwise inconspicuous files.

While the following description centers on Fibre Channel (FC) storage area networks, embodiments to the present invention are not limited to these networks. Accordingly, embodiments of the invention can be used in conjunction with other types of storage network such as, for example, iSCSI networks, Fibre Channel over Ethernet (FCoE), serial attached SCSI (SAS) networks, etc. Furthermore, embodiments of the present invention can be used with various non-SAN networks that may use similar authentication mechanisms as the networks discussed above.

Figure 1:
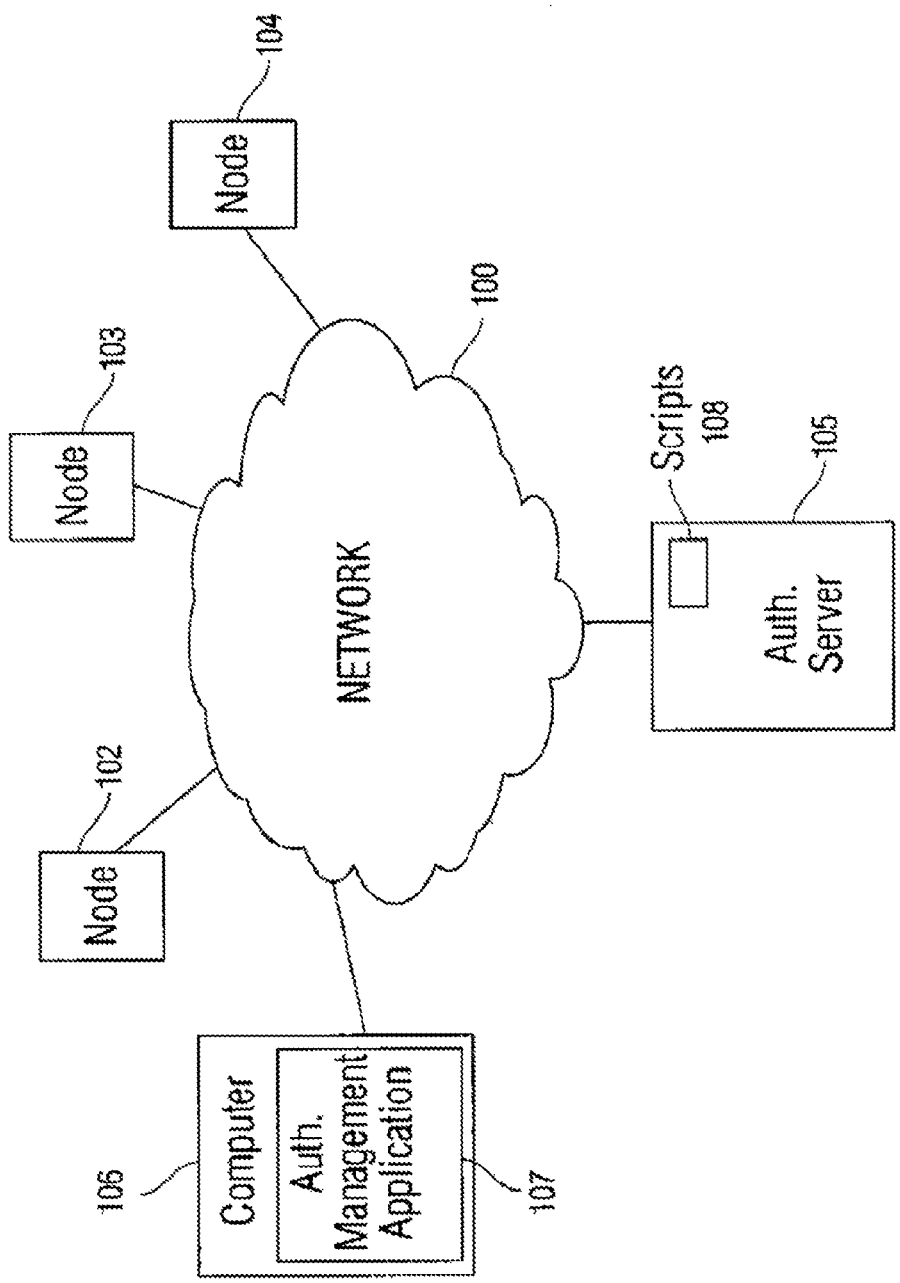
FIG. 1 is a diagram of an exemplary network according to embodiments of the present invention.

FIG. 1 is a diagram of an exemplary network according to some embodiments of the invention. Network 100 can be a SAN, such as an FC, iSCSI, or FCoE SAN, or another type of network. Network 100 can be a combination of two or more networks.

A plurality of nodes may be connected to network 100. These can include various types of computers or network enabled electronic devices such as, for example, storage servers and/or redundant array of inexpensive drives (RAID) controllers connected to a storage area network. The nodes can be configured to communicate with each other according to a protocol that may require or allow authentication. For example, in the case of a Fibre Channel network, the nodes can communicate through the Fibre Channel protocol and use the DH CHAP protocol for authentication. In an iSCSI network, the CHAP protocol can be used for authentication. Each node of nodes 102-104 can store a name and secret associated with itself and use it when authenticating itself to other nodes.

Authentication server 105 can be server used to assist nodes 102-104 in authentication. Server 105 can be, for example, a RADIUS or a DIAMETER server. It should be noted that RADIUS and DIAMETER are designations of protocols according to which server 105 can operate, and not designations of specific implementations. For example, there are several different types of RADIUS server software available today from different vendors, such as the Internet Authentication Service provided by Microsoft, Alepo Radius Server, FreeRADIUS, etc. The authentication server 105 can be a generally programmable computer executing an authentication server software (such as one of the software products listed above) or an application specific hardware appliance (such as, for example, the Infoblox RADIUSone). The authentication server may also be implemented at one of the network elements of network 100, such as, for example, as software running at a switch in network 100.

The authentication server may store the names and secrets of the nodes and verify authentications of the nodes. For example, if node 102 needs to authenticate node 103, it can send a challenge to node 103. Node 103 can respond to the challenge with a message including its name and a response that is the results of cryptographic hash of the secret and other values including the challenge value back to node 102. (In some cases, the challenge can include a random number, and node 103 can use the random number in building the response that is a cryptographic hash value (i.e. one way encryption) of the secret before sending it across the network). Node 102 can then send node 103's name and secret to the authentication server 105. The authentication server 105 can check the received name and secret of node 103 against respective values stored in its local database, and determine if there is a match. If there is a match the authentication is successful. If there is no match, the authentication has failed. The authentication server can send a message back to node 102 indicating whether the authentication was successful. Based on this message, node 102 can determine whether node 103 is really the node it purports to be.

Thus, nodes 102-104 can authenticate each other without necessitating that each node store all the authentication data of all other nodes (which would make authentication very insecure). Therefore, nodes 102-104 can be referred to as clients of authentication server 105 and can include hardware or software that performs authentication client functionality according to a relevant protocol (such as, for example, RADIUS or DIAMETER).

Computer 106 may also be connected to network 100. Computer 106 may run an authentication management application 107. Application 107 can be an application that manages the authentication of a set of network connected devices, such as nodes 102-104. The authentication management application may also provide additional network management functionalities and may be referred to as a network management application. Alternatively, computer 106 can be an application specific appliance that is configured to perform the authentication management function.

In some embodiments, the authentication management application 107 may be implemented at one of the network elements of network 100, such as, for example, as software running at a switch in network 100. In some embodiments, the authentication management application may be implemented at the authentication server 105, or may be executed at the same computer as the authentication server.

The authentication management application may obtain the names of the node it manages. It may perform this by using standard discovery protocols of network 100, or it may allow a user to enter the names of the nodes to be managed. Having obtained the names, the authentication management application can assign or otherwise establish secrets to the nodes it manages (i.e., nodes 102-104), and associate each secret with the name of the node it is assigned to. After assigning or establishing the secrets, the authentication management application may send to each node its assigned secret. The secrets may be encrypted during transmission. The authentication management application can assign secrets automatically, by a predefined algorithm by the use of random number generation or other key agreement protocols. Alternatively it may allow a user of the application to enter the secrets. In some embodiments, nodes 102-104 can assign their own secrets and send their secrets to the authentication management application 107 through network 100. The authentication management application may store the secrets assigned to devices 102-104 locally.

In some embodiments, the authentication management application may also perform a policy check of the assigned secrets. In some embodiments, there may exist rules for what types of secrets may be used. These rules may be used to prevent the assignment of "weak" secrets (i.e., secrets or passwords that are easy to compromise). Thus, the rules may specify that the secrets must be of a predefined length, a predefined complexity, that they must exclude dictionary words, etc. If a given secret entered by a user or provided by a node fails the policy check, the authentication management application may refuse to assign that secret and may request the user or the node to provide another secret.

Once the authentication management application has assigned all secrets, it may assemble the secrets and the respective names of their associated nodes in a single data structure (such as, for example, a file) and send them to the authentication server. The authentication server can load the secrets and associated names in its local database and use them for authentication of nodes 102-104 as discussed above. In order to send the file of names and secrets to the authentication server, the authentication management application may also include authentication client functionality (such as, for example, RADIUS or DIAMETER client functionality).

The authentication management application may encrypt the file before it sends it to the authentication server. Alternatively, or in addition, the authentication management application may also use steganography to embed the file with names and secrets in another file. Steganography is a known technique of embedding a first set of data in a second set of data. Thus, the file with names and secrets can be embedded in a more inauspicious looking file, such as a video or an audio file. Accordingly, steganography may be used to provide additional security by preventing any rogue device that may be monitoring network communications from flagging the transmitted file as important. The authentication server can extract the file with names and secrets from the other file and/or decrypt it.

The clients of authentication server (such as nodes 102-104 and authentication management software 107) may be required to provide an authentication server password to communicate with the authentication server. In some embodiments, that same password or derivation thereof may be used to encrypt the file of secrets sent by the authentication management application 107 to the authentication server.

In some embodiments, the file including the list of names and secrets can be arranged in a predefined interoperable format. The format can be referred to as interoperable because it may be readable and processable by different types of authentication servers offered by different vendors.

In some embodiments, additional software 108 (such as, for example, one or more scripts) may reside at the authentication server 105 or possibly on the computer 106. The additional software 108 may be used to send or receive or translate the file including the names and secrets of the nodes, perform any necessary decryptions and/or extraction and load the file into a database for authentication server 105. Thus, additional software 108 may allow embodiments of the present invention to be used with various existing authentication server software products, without having to further modify them for the purposes of the present invention.

Furthermore, different versions of additional software 108 may be developed for different versions of existing authentication servers. The different versions may be configured to operate with a single format of the file comprising the names and secrets of the nodes which is to be generated and sent by the authentication management application. Thus, embodiments of the present invention may provide for that a single authentication management application may be interoperable with different types of authentication servers. In some embodiments, once added to the authentication server, the additional software 108 may be considered to be part of the authentication server or the authentication management application.

Figure 2:
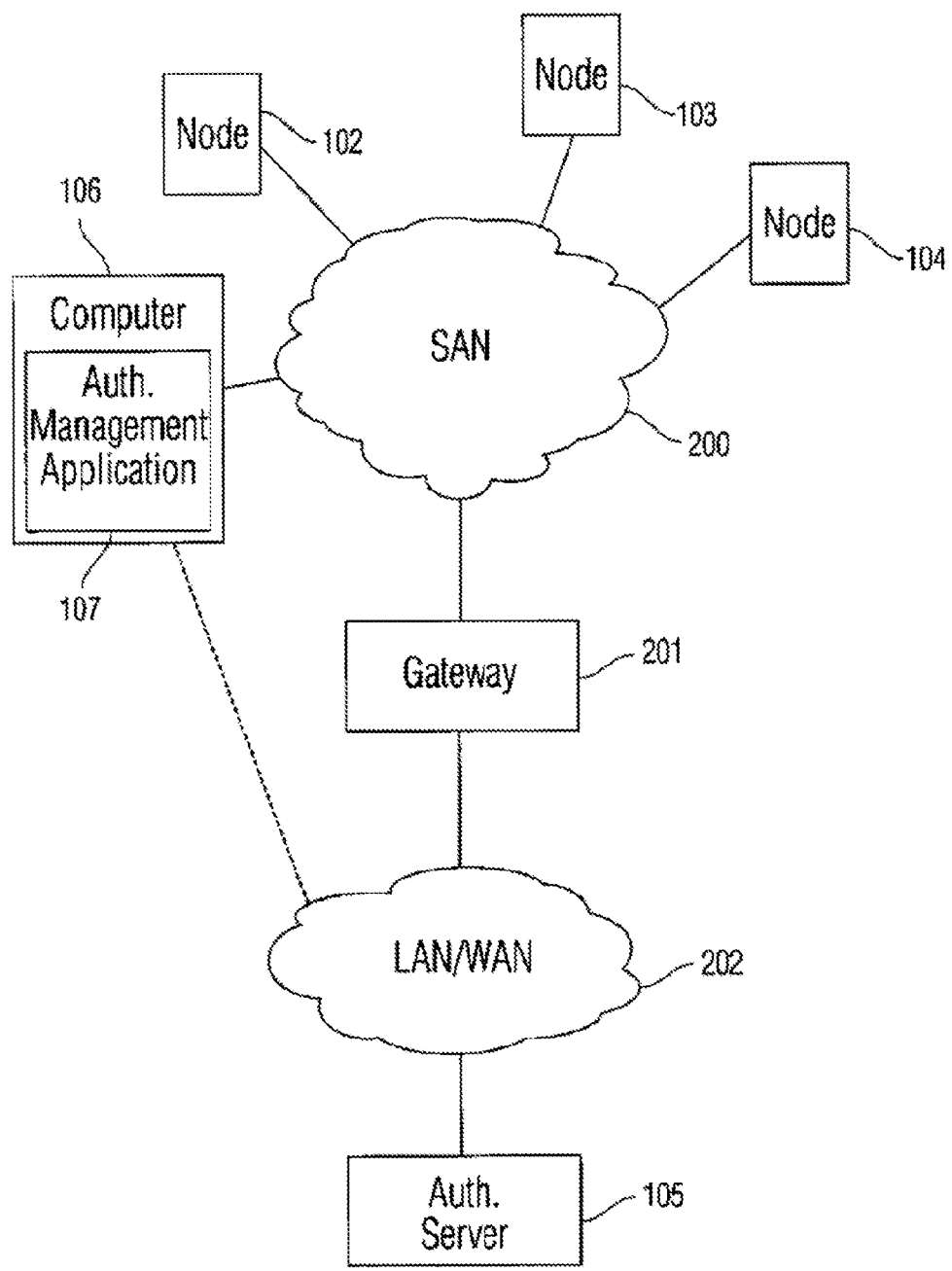
FIG. 2 is another diagram of an exemplary network according to embodiments of the present invention.

FIG. 2 is a diagram of another exemplary network according to embodiments of the present invention. More specifically, FIG. 2 is a diagram of a special case of the network of FIG. 1 involving a storage area network. In FIG. 2, the generic network 100 of FIG. 1 actually comprises two connected networks—200 and 202. Network 200 can be a storage area network, such as, for example, an FC, iSCSI, FCoE and/or SAS networks. As noted above, nodes 102-104 can be various nodes that may connect to a SAN such as, for example, file servers, web servers, RAID arrays, etc.

Network 202 can be a local area network (LAN) or a wide area network (WAN). LAN/WAN 202 can be, for example, an Ethernet network. Gateway 201 can be a device for interconnecting to different types of networks such as SAN 200 and LAN/WAN 202.

As shown, nodes 102-104 as well as the computer 106 hosting the authentication management application 107 can be connected to SAN 200. Thus, they may communicate with authentication server 105 through gateway 201. In some embodiments, computer 106 may be alternatively connected to LAN/WAN 202. Alternatively, computer 106 may be simultaneously be connected to both networks 200 and 202.

As shown, authentication server 105 may be connected to network 202. The embodiment of FIG. 2 may be beneficial because most existing authentication servers are not configured for direct connection with most existing SANs and instead require connection to an ordinary Ethernet network. Furthermore, some embodiments may provide that authentication server 105 serve multiple SANs connected to LAN/WAN 202. In some embodiments, multiple authentication servers can be present. In some embodiments, a single authentication management application can serve multiple authentication servers.

As noted above, the combination of network 200, gateway 201 and network 202 may be considered to be a single heterogeneous network.

Figure 3A:
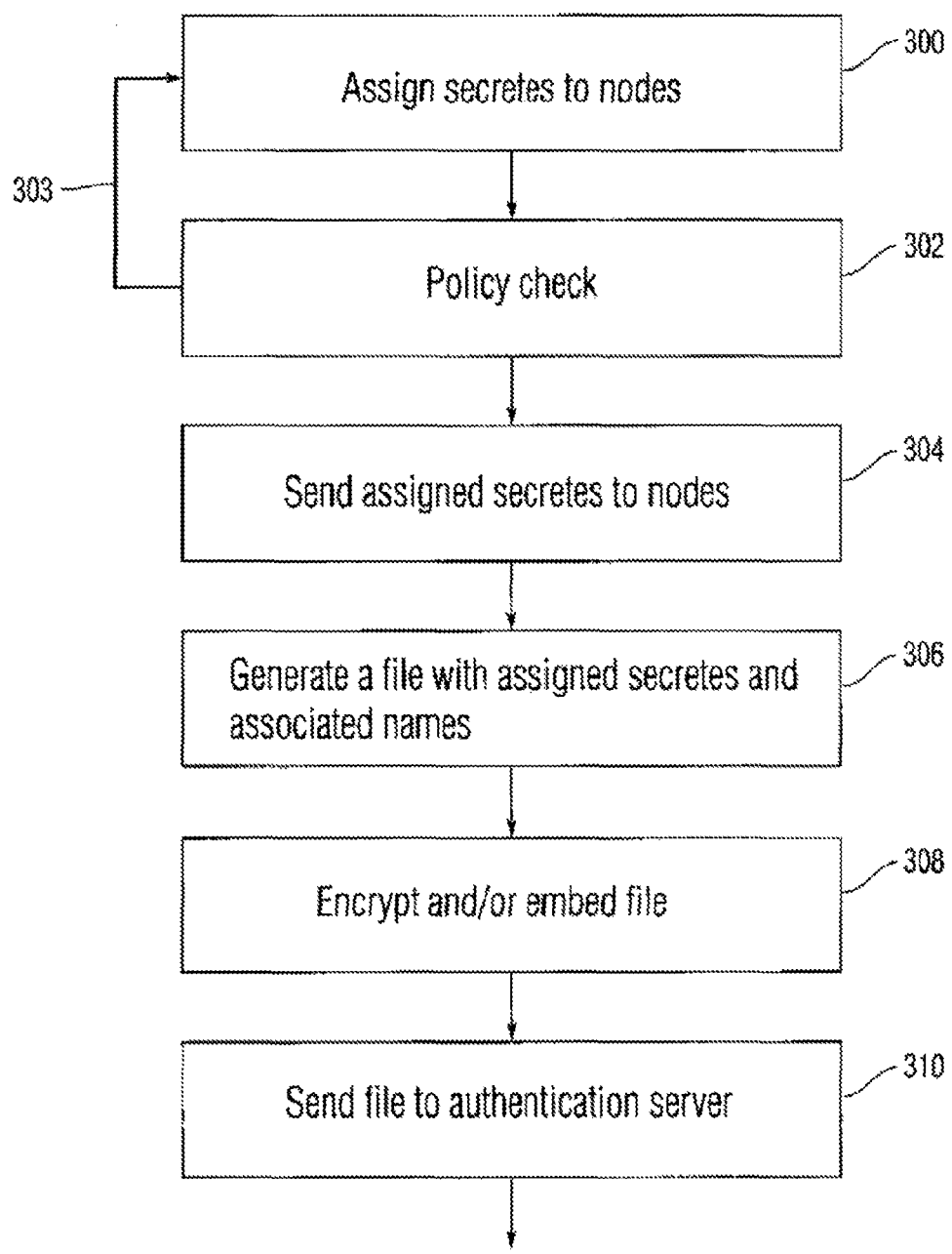
FIGS. 3A and 3B are a flowchart showing an exemplary method of configuration of an authentication server according to embodiments of the present invention.
Figure 3B:
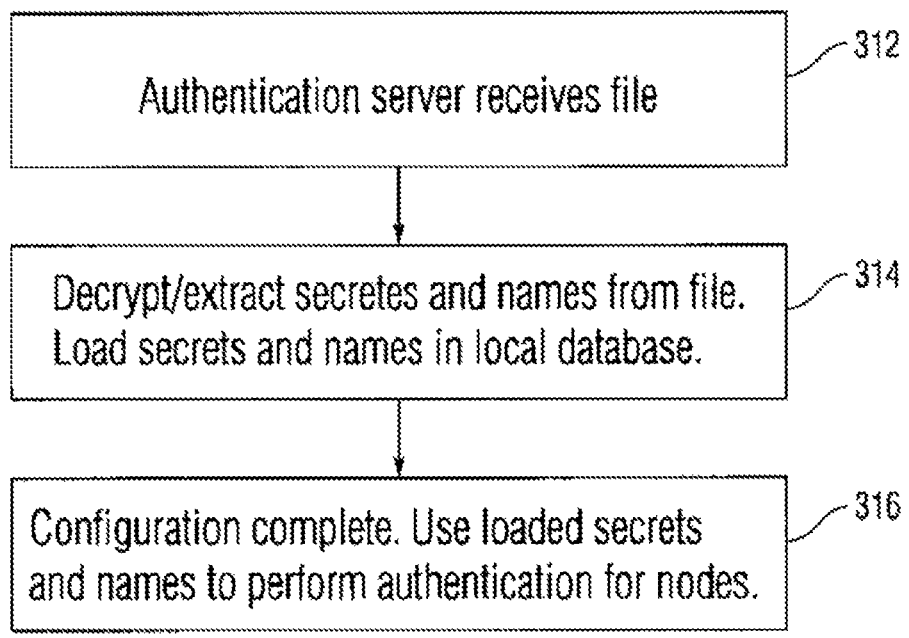

FIGS. 3A and 3B are a flowchart showing an exemplary method of configuration of an authentication server according to embodiments of the present invention. Referring to FIG. 3A, at step 300, the authentication management application assigns secrets to various nodes. At step 302, the authentication management application performs a policy check on the secrets. If one or more of the secrets fail the policy check they may need to be reassigned (arrow 303). At step 304, the authentication management application sends the assigned secrets to their respective nodes. The secrets may be encrypted before being sent to the nodes. As noted above, other embodiments may provide that the nodes generate their own secrets and forward them to the authentication management application instead. Or in other embodiments, the authentication management application may use a protocol to establish the secret for a remote node.

At step 306, the authentication management application generates a data structure including a list of the assigned secrets and the names of the devices the respective secrets are associated with. As noted above, the data structure may, but need not necessarily be a file. At step 308, the file is encrypted and/or embedded in another file using steganography. At step 310, the file is sent to the authentication server.

Continuing to FIG. 3B, at step 312, the authentication server receives the file. At step 314, the authentication server decrypts and/or extracts the secrets and names from the received file and loads them in its local database. At step 316, configuration is complete. The nodes being served by the authentication server (e.g., nodes 102-104 of FIGS. 1 and 2) may resume normal operation and the authentication server may use the stored names and secrets to perform authentication for these nodes.

Thus, authentication can be performed without having to manually enter nodes' names and secrets into an authentication server. This may greatly improve the ease of administration of a network. This may also improve the security and reliability of a network, as manual entry of names and secrets into an authentication server may be considered to be a security vulnerability as well as a source of inadvertent entry errors.

Various devices discussed herein, such as authentication server 105, computer 106, and nodes 102-104 may run on programmable computers, or other types of programmable electronic devices. A programmable device may include a processor, such as a central processing unit (CPU) and a memory. The processor may operate by executing instructions stored in the memory. These instructions may comprise, for example, the authentication management application 107, one of various authentication server software products executing at authentication server 105, and/or scripts 108. The memory can also store data, such as the authentication server's local database, the file of node names and secrets, etc.

The various devices can also include networking hardware. The networking hardware may include, for example, a network interface card (NIC—often used for connecting to Ethernet networks) and/or a host bus adapter (HBA—often used for connecting to FC or iSCSI networks). Some devices may include both a NIC and an HBA. For example, in the embodiment in which the computer 106 is connected to both SAN 200 and LAN/WAN 202, computer 106 may include a NIC for connecting to LAN/WAN 202 and an HBA and its associated driver software for connecting to SAN 200.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method comprising:
    assigning a plurality of secrets to a plurality of nodes of a network, so that each respective secret is assigned to a respective node and associated with a node identifier of the respective node; and
    generating a data structure comprising the assigned secrets and the node identifiers that the respective secrets are associated with;
    wherein an authentication server is configured to obtain the assigned secrets from the data structure and to use the assigned secrets to perform authentication for the plurality of nodes.

2. The method of claim 1, further comprising securing the data structure.

3. The method of claim 2, wherein securing the data structure comprises encrypting the data structure.

4. The method of claim 3, wherein encrypting the data structure comprises encrypting the data structure with a password used for communications with the authentication server or a derivation thereof.

5. The method of claim 2, wherein securing the data structure comprises embedding the data structure within a second data structure through the use of steganography.

6. The method of claim 1, further comprising generating the plurality of secrets.

7. The method of claim 1, wherein the assigning and generating a data structure are performed by an authentication management application executed at a computer that is distinct from the authentication server.

8. The method of claim 1, further comprising associating each secret with a node identifier of a node the secret is assigned to and saving the associated node identifiers in the data structure.

9. The method of claim 1, wherein the network comprises a storage area network.

10. The method of claim 9, wherein the storage area network is a network selected from the group consisting of a Fibre Channel network, an iSCSI network and an FCoE network.

11. The method of claim 1, further comprising integrating the data structure into an authentication server database.

12. A computer readable medium comprising computer executable instructions configured to cause a processor to perform a method comprising:
 assigning a plurality of secrets to a plurality of nodes of a network, so that each respective secret is assigned to a respective node and associated with a node identifier of the respective node; and
 generating a data structure comprising the assigned secrets and the node identifiers that the respective secrets are associated with;
 wherein an authentication server is configured to obtain the assigned secrets from the data structure and to use the assigned secrets to perform authentication for the plurality of nodes.

13. The computer readable medium of claim 12, wherein the method further comprises generating the plurality of secrets.

14. The computer readable medium of claim 12, wherein the computer executable instructions are part of an authentication management application, and the processor is part of a computer that is distinct from the authentication server.

15. The computer readable medium of claim 12, wherein the method further comprises associating each secret with a node identifier of a node the secret is assigned to and saving the associated node identifiers in the data structure.

16. A device comprising a processor and a memory, the memory comprising a plurality of instructions executable at the processor and configured to cause the processor to:
 assign a plurality of secrets to a plurality of nodes of a network, so that each respective secret is assigned to a respective node and associated with a node identifier of the respective node; and
 generate a data structure comprising the assigned secrets and the node identifiers that the respective secrets are associated with;
 wherein an authentication server is configured to obtain the assigned secrets from the data structure and to use the assigned secrets to perform authentication for the plurality of nodes.

17. The device of claim 16, wherein the instructions are further configured to cause the processor to generate or otherwise establish the plurality of secrets.

18. The device of claim 16, wherein the instructions are part of an authentication management application, and the device is distinct from the authentication server.

19. The device of claim 16, wherein the instructions are further configured to cause the processor to associate each secret with a node identifier of a node the secret is assigned to and save the associated node identifiers in the data structure.

20. The device of claim 16, wherein the network comprises a storage area network.

21. The device of claim 16, wherein the storage area network is a network selected from the group consisting of a Fibre Channel network, an iSCSI network and an FCoE network.

22. A storage area network comprising the device of claim 16.

23. A Fibre Channel network comprising the device of claim 16.

24. A network comprising:
 a plurality of nodes;
 a computer executing an authentication management application; and
 an authentication server,
 wherein the computer executing the authentication management application is configured to
  assign a plurality of secrets to a plurality of nodes of a network, so that each respective secret is assigned to a respective node and associated with a node identifier of the respective node, and
  generate a data structure comprising the assigned secrets and the node identifiers that the respective secrets are associated with; and
 the authentication server is configured to
  obtain the assigned secrets from the data structure, and
  use the assigned secrets to perform authentication for the plurality of nodes.

25. The network of claim 24, wherein the network is selected from the group consisting of a Fibre Channel network and an iSCSI network.

\* \* \* \* \*